United States Patent [19]

Wartenberg

[11] 3,793,127

[45] Feb. 19, 1974

[54] TOUGHENED GLASS

[76] Inventor: Erwin W. Wartenberg, Brunnenwiesen 6, Riedenberg, Stuttgart, Germany

[22] Filed: Nov. 30, 1971

[21] Appl. No.: 203,428

Related U.S. Application Data

[60] Division of Ser. No. 74,897, Sept. 23, 1970, Pat. No. 3,653,866, and a continuation-in-part of Ser. No. 692,778, Dec. 22, 1967, abandoned.

[30] Foreign Application Priority Data

Dec. 28, 1966 Germany .............................. W43078

[52] U.S. Cl. ...................................... 161/1, 161/165
[51] Int. Cl. ............................................. C03b 27/00
[58] Field of Search ........................ 161/164–166, 1; 65/24, 116, 114

[56] References Cited
UNITED STATES PATENTS

| 1,976,915 | 10/1934 | Black | 161/411 X |
| 3,107,196 | 10/1963 | Acloque | 161/164 |
| 3,186,816 | 6/1965 | Wartenberg | 65/116 |
| 3,592,726 | 7/1971 | Blizard | 161/166 X |
| 3,595,725 | 7/1971 | Coen | 65/114 X |
| 2,285,595 | 6/1942 | Littleton et al. | 65/116 |
| 2,198,739 | 4/1940 | Phillips | 65/116 |
| 3,271,207 | 9/1966 | Davis | 65/116 X |

Primary Examiner—Charles E. Van Horn
Attorney, Agent, or Firm—John P. Snyder

[57] ABSTRACT

Toughened glass of thickness in the range 0.8 mm to 3.5 mm is obtained by quenching in a two-component liquid medium, and has a modulus of rupture of from $14 \times 10^3$ p.s.i. and, upon destruction by sharp impact fracture, shatters into from 8 to 100 fragments per $cm^2$ of the glass.

12 Claims, 3 Drawing Figures

TOUGHENED GLASS

CROSS REFERENCE TO RELATED APPLICATIONS

This application is a division of co-pending application Ser. No. 74,897, filed Sept. 23, 1970 now U.S. Pat. No. 3,653,866 and is a continuation-in-part of prior co-pending application Ser. No. 692,778, filed Dec. 22, 1967 and now abandoned.

BACKGROUND OF THE INVENTION

The present invention relates to toughened glass produced by quenching a hot glass body in a quenching liquid.

It is known to increase the mechanical strength of glass by a toughening process. Such toughening is carried out by first heating the glass and then uniformly and suddenly cooling the heated glass, i.e., by quenching. Gases or liquids may be used as quenching agents. Toughened glasses find practical application, for example as glass windows for motor vehicles, due to the fact that toughened glass has increased strength and, furthermore, upon being subjected to stress the properly toughened glass sheet will fragment into a great number of relatively small particles which do not have sharp, and therefore dangerous, edges.

Known liquid quenching methods are effective for toughening glass sheets having a thickness of at least about 3.4 mm, to improve the mechanical strength of the glass which, upon severe impact, breaks into many relatively small and harmless particles. Control of particle count is essential in the manufacture of safety glass for motor vehicles.

Usually, safety glass used in motor vehicles has a thickness of between about 5 mm and 6 mm. However, it is becoming more and more desirable to reduce the thickness of automobile glass, particularly in view of the larger glass area which is used in modern automobiles. Thus for economic as well as for structural reasons it has become important to reduce the thickness of the glass used as windows and windscreens in motor vehicles.

It has also been found that this safety-glass because of its high elasticity diminishes greatly the risk of severe skull injuries on head impact.

Many attempts have been made to produce extremely thin glasses, which in terms of their mechanical strength, and fracture characteristics and elasticity upon severe impact, are suitable for use in motor vehicles. It has been found desirable to reduce the thickness of automobile windows to between about 1.6 mm and 2.5 mm. However, it has not been possible hitherto to toughen glass sheets of such small thickness by conventional methods, in such a manner that the toughened glass will comply with official safety requirements and will possess the mechanical strength desirable for automobile windows, windscreens and the like.

Recently chemical toughening methods have been developed for producing glass sheets having a thickness of between about 2.0 mm and 2.5 mm which sheets have a high degree of mechanical strength and form the desired large number of small particles upon being disintegrated by mechanical force. These methods are based on the principle of ion exchange. Although the glass sheets produced by this method are thinner and have higher modulus of rupture than glass which was toughened by the conventional quenching method, the ion exchange method has the great disadvantage that it cannot be used for toughening glass sheets or ordinary soda-lime-silica composition. Alumino-silicate glass must be used as an initial material in the ion-exchange process, in order to produce residual compressive stress at the surface of the glass by exchange of sodium for potassium or lithium ions. Toughening by ion exchange cannot be achieved with ordinary sheet glass because the chemical composition of ordinary sheet glass is unsuitable for ion exchange processes.

It is an object of the present invention to provide a process for the toughening of a wide range of glasses, irrespective of their composition, including ordinary sheet glass and, furthermore, to toughen such glass sheets which are relatively thin. By the method of the present invention it is possible to toughen glass sheets whose thickness is considerably less than 3.5 mm and to obtain the same mechanical strength as is obtainable in alumino-silicate glasses by the ion exchange methods. Glass sheets having a thickness of only about 0.8 mm when toughened in accordance with the present invention, will fragment, when shattered, into small and relatively harmless glass particles.

Toughened glass produced by the method of the present invention is particularly suitable as single sheet safety glass in motor vehicles. The mechanical strength of the toughened glass is about 8 times as high as the mechanical strength of untoughened glass and about three times the mechanical strength which is obtained by subjecting similar glass to a conventional quenching method.

The high degree of mechanical strength of the glass, particularly of glass sheets, is achieved by quenching the glass in a chilling liquid in such a manner that the glass will be cooled much faster than has been possible hitherto. The speed of cooling exceeds that which could be obtained by using pure water as a chilling liquid, although it has been assumed that pure water represents the fastest and most effective chilling liquid.

Many attempts have been made to toughen glass by quenching in water; however, these attempts were not successful because quenching of heated glass in water caused cracking of the glass or at least considerable damage to the glass surface so that water-quenched glasses had to be discarded.

U.S. Pat. No. 3,186,816 and German Pat. No. 1,034,333 disclose processes according to which heated glasses are quenched in a liquid and the energy required for vaporization of the liquid causes quick cooling of the glass. The liquid which is used for quenching is maintained by a succession of hot glasses at a temperature in the vicinity of and preferably slightly below, its boiling point.

It has been found possible by three prior methods to toughen glasses of thickness at least 3.5 mm and to obtain thereby glasses which fragment into a great number of relatively small and harmless particles. However, it has not been possible to toughen glasses less than about 3.5 mm thick, because liquids having the required high heat of vaporization, when used for quenching relatively thin glasses, cause immediate destruction of the glass. Furthermore, within a range of heat of vaporization between about 100 and 150 calories per gram, it was not possible to produce a substantial reduction of the length of the quenching period or a substantial increase in the speed of cooling of the glass and concomitant therewith an increase in the mechanical strength of the toughened glass.

The methods of the two patents mentioned above require the formation of a gas layer or vapor sleeve around the hot glass in order to obtain faster quenching without destruction of the glass. The patents describe special ways of enhancing the formation of such vapor sleeve. Surprisingly, it now has been found that, notwithstanding the fact that the cooling of the glass is caused by vaporization of quenching liquid, the formation of a continuous gas or vapor layer along the glass surface and the maintenance of such gas or vapor layer for a certain period of time is undesirable when toughening thin glass, because extremely quick cooling which is the decisive requirement for obtaining the desired high degree of toughening of thin glasses, is prevented by the formation of such vapor layer.

Consequently, the present invention proposes to maintain throughout the quenching process direct contact between hot glass and quenching liquid, without the production of an interposed vapor layer.

SUMMARY OF THE INVENTION

Toughened glass, in particular a toughened thin sheet of soda-lime-silica glass, is produced by quenching the hot glass in a quenching bath which consists essentially of a major proportion of a liquid which is inert relative to the glass and a minor proportion of a low boiling point additive.

Glass of thickness in the range 0.8 mm to 3.5 mm when so toughened has a modulus of rupture of from $14 \times 10^3$ p.s.i. to $56 \times 10^3$ p.s.i. and, upon destruction by sharp impact fracture, a fragmentation number of from 8 fragments per $cm^2$ to 100 fragments per $cm^2$.

DESCRIPTION OF THE PREFERRED EMBODIMENTS

Figure 1:
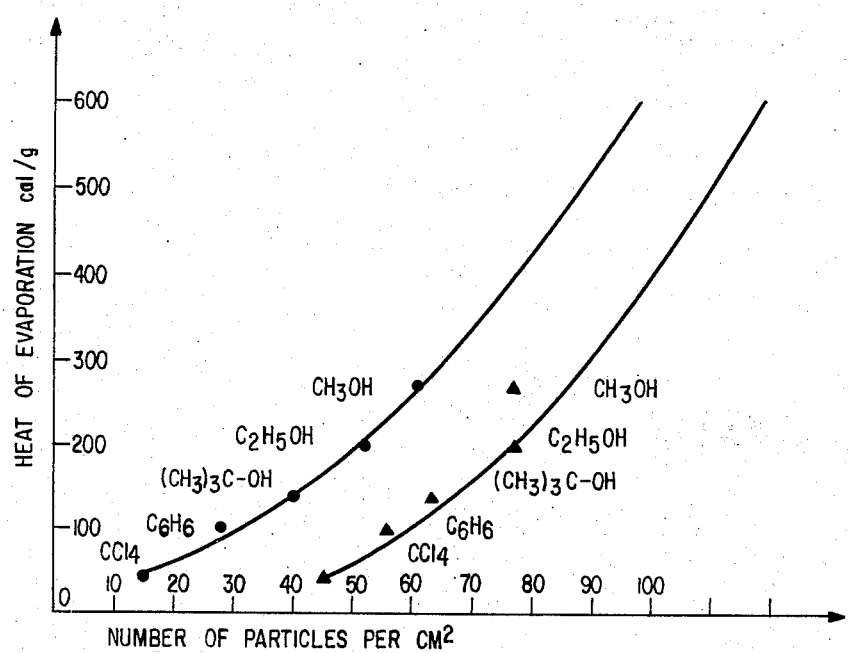
FIG. 1 is a graphic representation of the relationship with respect to various quenching liquids and concentrations between heat of vaporization and the number of glass particles formed upon destructive impact.

According to the present invention, sudden cooling of the glass body is achieved due to vaporization of a low boiling point cooling liquid in direct contact with the surface of the hot glass body.

This is achieved by using as a liquid quenching medium, a chilling liquid which is a mixture of carrying liquid having a relatively high boiling point, but which is below the temperature of the heated glass body, and a second liquid which has a lower boiling point than the carrying liquid in an amount of up to about 4% of the weight of the chilling liquid thus formed. The low boiling point liquid must have a boiling point and heat of vaporization such that it will quickly evaporate when it is in contact with the hot glass. The low boiling point liquid is chosen in dependence on the degree of toughening required, and so that there is a relatively large difference, of at least 100° C, between the boiling point of the low boiling point liquid and the incipient boiling point of the carrying liquid, which is at least 200° C. The nature of the low boiling point liquid is such that upon vaporization it will not have any destructive effect on the surface of the hot glass body.

Due to the relatively small proportion of low boiling point liquid which is incorporated in the chilling liquid, the low boiling point liquid will be vaporized in contact with the glass surface but will not be capable of forming thereon a coherent gas or vapor layer on the glass surface.

The method of the present invention may be used to quench glasses of any composition, for instance, sodium-potassium glass or, generally, all types of alkali metal - alkaline earth metal - silicate glasses, e.g. soda-lime-silica glass. The method may be used for the quenching of all types of plate glass and window glass as well as for special glasses such as boro-silicate glasses or lead-silicate glasses.

In an earlier liquid quenching method a piece of plate glass which has been heated nearly to its softening point, for example to about 630° C, and which is 1.8 mm thick, and has an expansion coefficient of $90 \times 10^{-7}$ °$C^{-1}$ was quenched in pure boiling carbontetrachloride and a continuous gaseous phase was formed on the surfae of the cooling glass body and persisted for about 40 seconds. Glass which has been quenched in this manner has a mechanical strength which is about twice that of similar but untoughened glass. However, upon being subjected to destructive impact, the glass thus quenched will not disintegrate into a great number of relatively small and harmless particles.

The formation of a continuous vapor layer on the glass surface is prevented according to the present invention by incorporating in a carrying liquid whose incipient boiling point is at least 200° C, a relatively small proportion of a low boiling point liquid whose boiling point is at least 100° C below the boiling point of the carrying liquid. The chilling liquid thus formed is used as a quenching bath, preferably at a temperature which is in the vincinity of, usually slightly below, the boiling point of the low boiling point liquid. Because the boiling point of the carrying liquid is at least 100° C higher than the boiling point of the low boiling point liquid, essentially only the low boiling point liquid is vaporized during the quenching of the hot glass. The presence in the chilling liquid of at least about 96% by weight of the higher boiling point carrying liquid, prevents the formation of a continuous gas or vapor layer even though the low boiling point liquid is being varporized and, consequently the cooling and quenching of the glass takes place immediately the hot glass enters the liquid, by the vaporization of low boiling point liquid in direct contact with the hot glass surface. The entire heat required for the vaporization of the contacting low boiling point liquid is withdrawn rapidly from the glass and thereby very quick cooling is achieved during which essentially only low boiling point liquid is vaporized.

For obtaining the desired high degree of toughening, it is important that cooling of the glass from a temperature just below the softening point of the glass, i.e., from the temperature at which the hot glass is exposed to quenching, for example 630° C, down to a temperature below the strain point of the glass, e.g. about 350° C is carried out as quickly as possible. Such very quick cooling is achieved according to the present invention by the vaporization of the low boiling point liquid in direct contact with the glass body. The further cooling of the glass from about 350° C down to the temperature of the quenching bath is of little consequence in determining the final degree of toughening of the glass.

Referring now to the drawing, FIG. 1 illustrates the relationship between heat of vaporization and the fragmentation number for carbon tetrachloride $CCl_4$; benzene $C_6H_6$; tertiary butanol $(CH_3)_3C-OH$; ethanol $C_2H_5OH$ and methanol $CH_3OH$ employed as low boiling point liquid in a mineral oil "Shell QB3" whose incipient boiling point is about 300° C. The left-hand curve represents a concentration of 0.3% by weight and the right-hand curve a concentration of 1% by weight. It is evident from the curves of FIG. 1 that with increasing heat of vaporization of the low boiling point liquid, the number of particles formed upon fragmentation and thus the degree of toughening of the glass will increase.

The marked points on the curves of FIG. 1 are selected from tests carried out under similar conditions with the same high boiling point liquid "Shell Q.B.3," which has a density of 0.91, viscosity of 17.5 cst at 100° C, and flash point of 290° C. The incipient boiling point of this oil is about 300° C.

Table I gives results obtained using carbon tetrachloride (boiling point 76° C) as the low boiling point liquid.

A glass sheet whose coefficient of expansion is $90 \times 10^{-7}$ °C$^{-1}$ and dimensions $100 \times 100 \times 1.8$ mm was heated in an electric furnace to about 630° C and immediately thereafter was immersed in a quenching bath located below the furnace. The quenching bath of the chilling liquid was constituted by a mixture of 5 litres of the mineral oil with several grams of carbon tetrachloride, e.g. 9 grams of carbon tetrachloride is equivalent to 0.2% by weight of the chilling liquid; 22.5 grams of carbon tetrachloride is equivalent to 0.5% by weight of the chilling liquid; and 45 grams of carbon tetrachloride is equivalent to 1% by weight of the chilling liquid.

The quenching bath was maintained at 100° C, and the hot glass sheet upon immersion, was cooled within about 6 seconds to a temperature of about 200° C. The results achieved with different concentrations of carbon tetrachloride were as follows:

In these tests 4.5 grams of methanol were added to 5 litres of the mineral oil to give a concentration of 0.1% by weight; and 22.5 grams of methanol were added to 5 litres of the mineral oil to give a concentration of 0.5% by weight.

Figure 3:
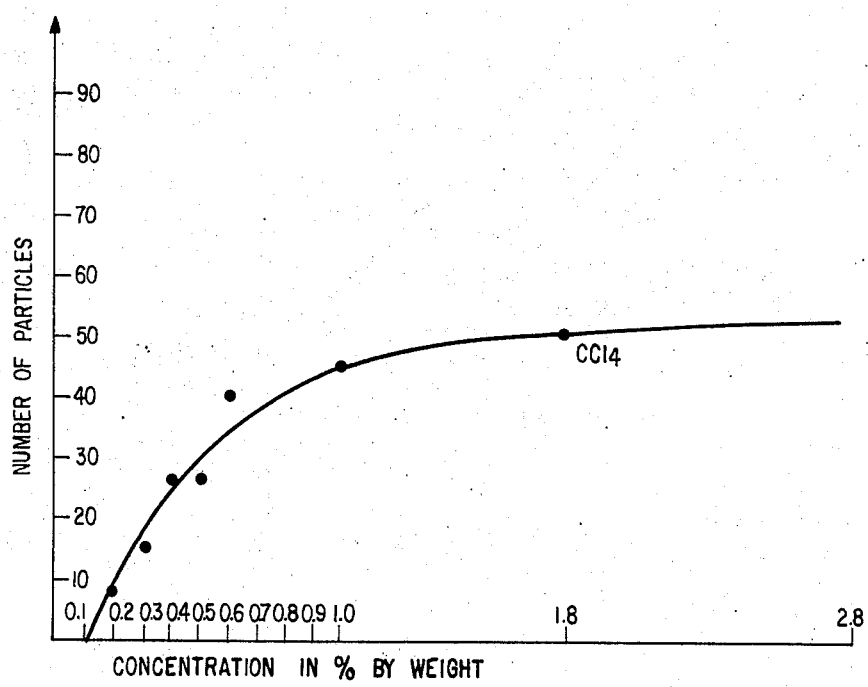
FIG. 3 is a graphic illustration of the relationship between the number of glass particles formed upon destructive impact and the concentration of a low boiling point liquid in the chilling liquid.
Figure 2:
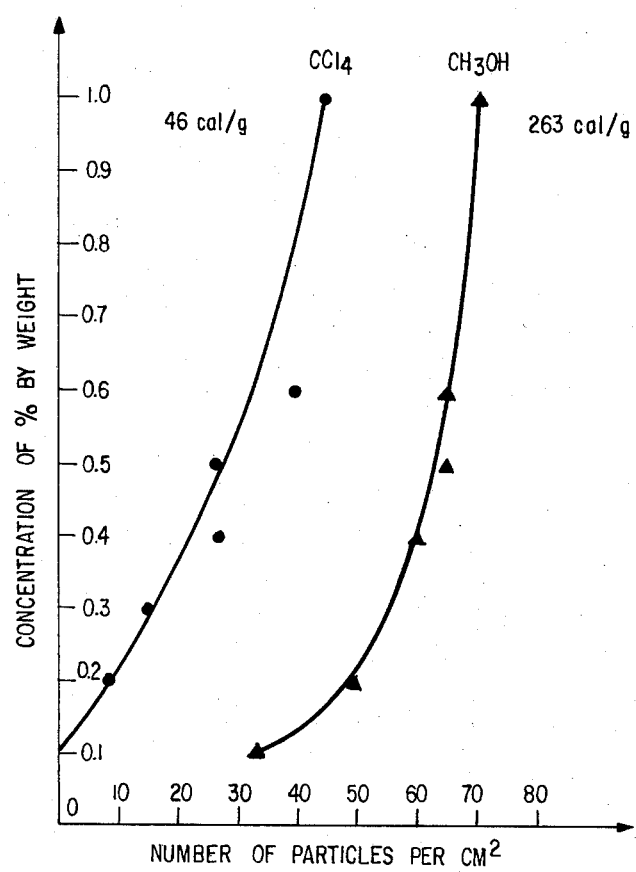
FIG. 2 is a graphic representation of the relationship between concentration of two lower boiling point liquids, and the number of glass particles formed upon destructive impact.

These results are illustrated graphically in FIGS. 2 and 3, and FIG. 2 shows that when between 0.2% and 1% by weight of carbon tetrachloride is added to the mineral oil the chilling liquid thus formed is heated to between about 80° C and 100° C and used at that temperature as quenching bath for toughening glass 1.8 mm thick, by heating the glass in conventional manner and then quenching the glass in the bath, toughened glass is produced which, when subjected to destructive impact, has a fragmentation number of between about 15 and 45 particles per square centimeter and has a modulus of rupture of between $14 \times 10^3$ p.s.i. and $28 \times 10^3$ p.s.i. or even higher, up to $42 \times 10^3$ p.s.i.

As is evident from the curves of FIG. 2, the fragmentation number and thus the tensile strength of the glass increases with increasing concentration of low boiling point liquid. The right-hand curve of FIG. 2 shows that substantially the same trend is indicated when methanol is used.

FIG. 3 is a curve, based on some of the results tabulated in Table I, in which fragmentation number on destructive impact is plotted against the concentration of carbon tetrachloride in the mineral oil. It is evident from this curve that when the concentration of carbon tetrachloride is about 1.5% by weight there is only further slight increase in the degree of toughening of the glass for a considerable increase in the concentration of carbon tetrachloride.

Table I and FIG. 3 show that the degree of toughening of the glass reaches a maximum represented by a fragmentation number of about 55 particles per cm$^2$, when the concentration of carbon tetrachloride is about 2.4% to 3% by weight. Thereafter as the concentration is increased the degree of toughening gradually falls, and when the concentration is increased to above 4% by weight a pronounced reduction in the strength of the toughened glass is observed. Furthermore it has been found that too great a concentration of the low boiling point liquid, above 4% by weight, may result in the production of surface defects in the glass during

TABLE I

| $CCl_4$ weight % | 0.1 | 0.2 | 0.3 | 0.4 | 0.5 | 0.6 | 1.0 | 1.8 | 2.4 | 4.0 | 4.8 |
|---|---|---|---|---|---|---|---|---|---|---|---|
| Fragmentation Number | — | 8 | 14 | 27 | 28 | 39 | 46 | 50 | 55 | 60 | 67 |
| Modulus of Rupture ($\times 10^3$ p.s.i.) | 30 | 37 | 39.5 | 41.2 | 42 | 44 | 45 | 47.5 | 48.5 | 47.6 | 47 |

The process was repeated under the same conditions with the mineral oil "Shell Q.B.3" as carrying liquid and with methanol $CH_3OH$ (boiling point 68° C) as the low boiling point liquid. The results obtained were as follows:

TABLE II

| $CH_3OH$ | 0.1 | 0.2 | 0.4 | 0.5 | 0.6 | 1.0 |
|---|---|---|---|---|---|---|
| Fragmentation Number | 32 | 50 | 60 | 64 | 62 | 72 |
| Modulus of Rupture ($\times 10^3$ p.s.i.) | 38 | 43 | 48 | 51 | 50.5 | 56 | quenching, e.g. the formation of grooves and hairline cracks in the glass surface.

Generally in carrying out the invention all liquids with high heat of vaporization and boiling points high relative to that of the low boiling point liquid, and preferably above 200° C and up to 400° C and more, are suitable for use as the carrying liquid, provided that the liquids employed do not have chemical effects on the glass surface. The carrying liquid may be an organic or an inorganic liquid.

Suitable carrying liquids are listed below by way of example, with their boiling points in °C where appropriate:

| | |
|---|---|
| Mineral oils<br>Fuel oils<br>Lubrication oils | incipient boiling point about 300°C or above |
| Kerosene | 200°–300°C. |

Vegetable and animal fats oils and waxes including:

rape seed oil
whale oil
palm oil
palm wax
shellac wax
hydrogenated castor oil
beeswax

| | |
|---|---|
| paraffin wax | 300°C |
| dodecane | 216 |
| tridecane | 243 |
| tetradecane | 253 |
| pantadecane | 270 |
| hexadecane | 287 |
| octadecane | 305 |
| Eicosane | 343 |
| naphthalene | 210 |
| 1-allyl-naphthalene | 256 |
| 1-chloro-naphthalene | 263 |
| 2-chloro-naphthalene | 256 |
| 1-(chloro-methyl)-naphthalene | 291 |
| 1,2-dichloro-naphthalene | 295 |
| 1,3-dichloro-naphthalene | 291 |
| 1,7-dichloro-naphthalene | 285 |
| 2,3-dimethyl naphthalene | 265 |
| 1,6-dimethyl-4-isopropyl naphthalene | 291 |
| 1-ethoxy naphthalene | 280 |
| 1,2,3,4-tetra hydronaphthalene (tetraline) | 207 |
| 2-acetyl-1-hydroxy naphthalene | 325 |
| 1-chloro-5-nitro-naphthalene | >360 |
| octachloronaphthalene | 440 |
| 6-acetyl tetraline | 289 |
| 1-tetralane | 255 |
| diphenyl | 255 |
| O-terphenyl | 332 |
| m-terphenyl | 365 |
| diamyl-benzene | 260–280 |
| triamyl benzene | 300–320 |
| tetraamyl benzene | 320–350 |
| furfural butyrate | 213 |
| trichlorobenzene | 210 |
| orthophosphoric acid | 213 |
| tributyl phosphoric | 289 |
| triisobutyl phosphoric ester | 264 |
| triphenyl phosphoric ester | 245 |
| tripropyl phosphoric ester | 252 |
| tris(3,5-dimethyl-phenyl) phosphoric ester | 290 |
| tri (2-tolyl) phosphoric ester | 410 |
| 1-hexadecyne | 284 |
| hexadecyl ester | 360 |

| | |
|---|---|
| 1-hexadecanol | 344 |
| hexadecanoic methyl ester | 415 |
| glycerol tripalmitate | 310 |
| stearin | >300 |
| phenyl stearate | 267 |
| oleic acid | 286 |
| stearic acid | 358 |
| oleonitrile | 330 |
| 1-octadecyne | 313 |
| Anthracene | 355 |
| 9,10-dihydroanthracene | 313 |
| 9,10-dihydro-9-ethyl anthracene | 320 |
| 9-phenyl anthracene | 417 |

A very wide choice of liquids as carrying liquids is thus possible, as exemplified above by such liquids as mineral oils and waxes, compounds with condensed benzene rings, paraffins, aromatic phosphoric acid esters and palmitic acid-glycerol ester. Usually the carrying liquid is chosen in dependence on the temperature at which the quenching bath is to be used, so that the bath temperature is well below the boiling point of the carrying liquid.

The choice of the higher boiling point carrying liquid is of relatively little importance in determining the speed of cooling of the glass and the degree of toughening which is achieved by the quenching of the glass, since the main heat transfer from the glass is achieved by the vaporization of the low boiling point liquid which forms only a small proportion of the chilling liquid.

It will be seen, as illustrated in FIG. 1, that by using the same first carrying liquid in combination with equal proportions of various low boiling point liquids, the speed of cooling of the glass and thereby the number of particles per square centimeter which are formed upon fragmentation and the mechanical strength of the glass, increases with increasing heat of vaporization of the low boiling point liquid. This shows that the rapid cooling of the glass is actualy achieved by the vaporization of the low boiling point liquid.

Suitable low boiling point liquids which are to be mixed in proportion of up to about 4% with the carrying liquid, should be chemically inert with respect to the glass to be quenched and include for example methanol, ethanol, carbon tetracloride, toluene, trichloroethylene, benzene, monochlorobenzene, and chloroform. Preferably the boiling point of the low boiling point liquid should be between about 70° C and 150° C, and the low boiling point liquid chosen is a liquid whose boiling point is at least 100° C below the incipient boiling point of the particular carrying liquid.

It is advantageous for producing highly toughened glass to choose lower boiling as well as higher boiling liquids which have a relatively high heat of vaporzation.

Results of tests carried out with some other low boiling point liquids will now be indicated in Tables III to VII.

TABLE III

Monochlorobenzene $C_2H_5Cl$ (boiling point 132° C) was mixed with the same mineral oil "Shell Q.B.3." The glass was heated to about 720° C and the quenching bath was at 100° C.

| $C_6H_5Cl$ weight % | 0.5 | 0.6 | 0.8 | 1.0 |
|---|---|---|---|---|
| Fragmentation Number | 19 | 20 | 35 | 30 |

TABLE IV

Ethanol $C_2H_5OH$ (Boiling point 77.6° C) was mixed with "Shell Q.B.3" oil and the quenching bath was maintained at 100° C.

| $C_2H_5OH$ weight % | 0.2 | 0.4 | 0.5 | 1.0 |
|---|---|---|---|---|
| Fragmentation Number | 53 | 63 | 66 | 68 |

TABLE V

Chloroform $CHCl_3$ (Boiling point 61° C) was mixed with "Shell Q.B.3" oil and the quenching bath was maintained at 100° C.

| CHCl$_3$ weight % | 0.7 | 1.0 | 1.5 | 2 |
|---|---|---|---|---|
| {Fragmentation Number | 30 | 40 | 54 | 60 |

TABLE VI

Benzene C$_6$H$_6$ (Boiling point 80° C) was mixed with "Shell Q.B.3" oil and the quenching bath was maintained at 80° C.

| C$_6$H$_6$ weight % | 0.2 | 0.3 | 0.5 | 1.0 |
|---|---|---|---|---|
| {Fragmentation Number | 21 | 20 | 46 | 52 |

TABLE VII

Trichloroethylene C$_2$H Cl$_3$ (Boiling point 86° C) was mixed with "Shell Q.B.3" oil and the quenching bath was maintained at 100° C.

| C$_2$H Cl$_3$ weight % | 0.4 | 1.0 | 1.5 | 2 |
|---|---|---|---|---|
| {Fragmentation Number | 14 | 35 | 52 | 56 |

When low boiling point liquids are used which contain OH groups, and have a high heat of vaporization, e.g. CH$_3$OH, C$_2$H$_5$OH, toughened glasses are obtained which may have a modulus of rupture of about 42,000 p.s.i. and thus are far superior to similar glasses which were quenched in conventional manner and thereby obtained a modulus of rupture of about 14,000 p.s.i. The values for modulus of rupture which are achieved according to the present invention are of the same magnitude as those of glasses which had been toughened by the ion exchange method. The number of particles into which toughened glasses will disintegrate upon destructive impact may be more than 100/cm$^2$ even if the glass was of a thickness of only 1.5 mm. The mechanical strength of such very thin glasses which are toughened by the method of the present invention makes it possible to bend these glasses easily so that the glass originally may be formed as a flat sheet and subsequently may be installed in curved rigid frames because it is able to adjust itself to a certain degree of curvature. The method of the present invention may also be used for toughening hollow or curved glass. Due to the high rate of cooling the method is particularly suitable for glass having a relatively small coefficient of expansion. Thus, good results are obtained with glasses having coefficients of expansion of between $5 \times 10^{-7}$ °C$^{-1}$ and $120 \times 10^{-7}$ °C$^{-1}$ and preferably between $30 \times 10^{-7}$ °C$^{-1}$ and $90 \times 10^{-7}$ °C$^{-1}$.

As pointed out above, the proportion of low boiling point liquid in the chilling liquid should not exceed about 4% by weight of the chilling liquid and generally will be between about 0.1% and 4% by weight, preferably between 0.5% and 2%.

It is a significant advantage of the present invention that by changing the percentage of the low boiling point liquid in the chilling liquid within the above indicated ranges the fragmentation number, or the degree of toughening, may be adjusted as desired.

Generally, in order to obtain the same results, the smaller the expansion coefficient of the glass, the higher must be the heat of vaporization of the low boiling point liquid, or, at the same heat of vaporization, the concentration of low boiling point liquid must be higher.

The temperature of the quenching bath is significant, and is usually maintained at about, often just below, the boiling point of the low boiling point liquid. This ensures immediate boiling of the low boiling point liquid on the glass surface and very rapid heat extraction from the glass surfaces as the glass enters the chilling liquid.

Table VIII indicates the way in which variation of the bath temperature can be seen to alter the degree of toughening of the glass.

In these experiments, 0.5% by weight of dichlorobenzene C$_6$H$_4$Cl$_2$ (Boiling point 180° C) were mixed with "Shell Q.B.3" oil to constitute the chilling liquid.

TABLE VIII

| Bath Temperature | 100°C | 150°C | 200°C |
|---|---|---|---|
| {Fragmentation Number | 13 | 17 | 20 |

Thus a higher degree of toughening is achieved as the bath temperature approaches the boiling point of the added dichlorobenzene, and when the bath temperature exceeds the boiling point of the dichlorobenzene an even greater degree of toughening results, although further bath temperatre increase would not be advisable because it would increase vaporization of the dichlorobenzene.

Suitable low boiling point liquids are as follows, the list includng those liquids already specifically referred to and the boiling points being given in °C:

| | |
|---|---|
| acetone | 56 |
| methanol | 65 |
| carbon tetrachloride | 76 |
| 1,1,1 trichloroethane | 74 |
| 1,2-dimethoxyethane | 84 |
| ethanol | 78 |
| trichloroethene | 87 |
| allyl isopropyl ethene | 83 |
| allyl propyl ethene | 90 |
| butyl ethenyl ether | 94 |
| diallyl ether | 94 |
| dipropyl ether | 91 |
| ethenyl isobutyl ether | 83 |
| ethyl isobutyl ether | 81 |
| 1-chloroethyl ether | 72 |
| 2-chloroethyl ether | 92 |
| benzene | 80 |
| 1-chloro-2 methoxybenzene | 90 |
| ethane phosphoric dimethylester | 82 |
| monochlorobenzene | 132 |
| dichlorobenzene | 180 |
| chloroform | 61 |
| Heptane | 98 |
| Hexane | 69 |
| Octane | 126 |
| 1,1,1,2-tetrachloroethane | 130 |
| 1,1,2,2-tetrachloroethane | 146 |
| 1,1,2, trichloroethane | 113 |
| 2-chloro-1-phenyl-ethanol | 128 |
| ternary butyl alcohol | 82 |
| 2,2-dichloroethanol | 146 |
| 2-dimethyl-amino ethanol | 135 |
| glycol monoethyl ester | 135 |
| tetrachloroethene | 121 |
| butyl propyl ether | 117 |
| 3-methyl butyl ether | 130 |
| cyclohexyl methyl ether | 133 |
| dibutyl ether | 142 |
| 2-chlorodiethyl ether | 107 |
| 1,2-dichlorodiethyl ether | 140 |
| 2'-chloro ethenyl ether | 108 |
| 1,2-dichloroethenyl ether | 128 |
| ethyl hexyl ether | 142 |
| Toluene | 110 |
| phosphorus oxychloride | 105 |
| phosphorus thiochloride | 125 |
| phosphorus trimethyl ester | 111 |

| | |
|---|---|
| isobutoxyethanol | 159 |
| ethenyl phenyl ether | 155 |
| 2-chloro-toluene | 159 |
| 3-chloro-toluene | 162 |
| 4-chloro-toluene | 162 |
| 2-butoxy-ethanol | 171 |
| benzyl methyl ether | 174 |
| 2,2'-dichlorodiethyl ether | 178 |
| benzyl chloride | 179 |

When carrying out the method of the present invention on a large scale, such as for the mass production of glasses for automobiles, it is advantageous to replenish continuously the vaporized low boiling point liquid. This may be accomplished either by condensing the vapors of low boiling point liquid which rise from the quenching bath by indirect heat exchange, for instance by means of cooling coils and recycling the condensed liquid into the quenching bath, or by the feeding of small amounts of low boiling point liquid, for example continuously drop-by-drop, equivalent to the amounts thereof which have been vaporized.

The rapid cooling of the hot glass which is achieved by the method of the present invention is based on the vaporization of the low boiling point liquid which is present in a relatively low concentration in the chilling liquid. The rapid withdrawal of heat from the glass by means of the liquid directly contacting the glass could also be carried out by decomposition or chemical conversion of a liquid, and all energy consuming processes in which the glass is rapidly cooled when it enters the chilling liquid can be effective in producing the required degree of toughening of the glass.

The vaporizing or decomposing cooling liquid is preferably continuously replaced at such a rate that the concentration of low boiling point liquid in the chilling liquid remains at least substantially constant.

Suitable combinations of high boiling point carrying liquid and low boiling point liquid, the latter being present in an amount of up to about 4% by weight of the chilling liquid, are set out in Table IX.

TABLE IX

| Carrying Liquid | | Low Boiling Point Liquid | |
|---|---|---|---|
| Naphthalene | 210°C | toluene | 110°C |
| | | trichloroethylene | 86°C |
| | | $C_2H_2Cl_3$ | |
| trichlorobenzene | 210°C | acetone | 56°C |
| phenyl stearate | 267°C | cyclohexanol | 160°C |
| paraffin wax | >300°C | cyclohexane | 80°C |
| hexadecanol | 344°C | phenol | 180°C |
| | | benzyl alcohol | 205°C |
| stearic acid | 358°C | acetic acid | 118°C |
| | | trifluoroacetic acid | 72°C |
| Stearin | | octane | 126°C |
| | | heptane | 98°C |
| | | trichloroethylene | 74°C |
| octachloronaphthalene | 440°C | 4-chlorotoluene (bath at 200°C) | 162°C |
| hexadecanoic methyl ester | 415°C | furfural acetate | 175°C |
| | | glycol diacetate | 180°–190°C |
| mineral oil | >300°C | carbon tetrachloride | 76°C |
| | | trichloroethylene | 74°C |
| | | monochlorobenzene | 132°C |
| tetraline | 207°C | monochlorobenzene | 132°C |
| orthophosphoric acid | 213°C | phosphorus oxychloride | 105°C |

It will be apparent from Table IX that the low boiling point liquid is chosen to ensure fulfillment of the condition that the boiling point of the low boiling point liquid is 100° C or more below the incipient boiling point of the carrying liquid.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. Toughened glass which comprises a glass sheet having a thickness in the range 0.8 mm to 3.5 mm, a modulus of rupture in the range $14 \times 10^3$ p.s.i. to $56 \times 10^3$ p.s.i., and a fragmentation number upon destruction by sharp impact which is within the range of 8 fragments per $cm^2$ to 100 fragments per $cm^2$, the fragments being characterised by granular nature free of sharp edges.

2. Toughened glass which comprises a glass sheet of soda-lime-silica composition having a thickness in the range of 0.8 mm to 3.5 mm, a modulus of rupture in the range of $14 \times 10^3$ p.s.i. to $42 \times 10^3$ p.s.i., and a fragmentation number upon destruction by sharp impact which is within the range of 8 fragments per $cm^2$ to 100 fragments per $cm^2$, the fragments being characterised by granular nature free of sharp edges.

3. Toughened glass which comprises a sheet of glass of soda-lime-silica composition and having (1) a thickness in the range of 0.8 mm to 3.5 mm, (2) a modulus of rupture in the range of $14 \times 10^3$ p.s.i. to $42 \times 10^3$ p.s.i., and (3) a fragmentation number upon destruction by sharp impact which is within the range of 8 fragments per $cm^2$ to 100 fragments per $cm^2$, the fragments being characterised by granular nature free of sharp edges.

4. For use in a vehicle windscreen, a sheet of glass of soda-lime-silica composition and having (1) a thickness in the range of 0.8 mm to 3.5 mm, (2) a modulus of rupture in the range of $14 \times 10^3$ p.s.i. to $56 \times 10^3$ p.s.i., and (3) a fragmentation number upon destruction by sharp impact which is within the range of 8 fragments per $cm^2$ to 100 fragments per $cm^2$, the fragments being characterised by granular nature free of sharp edges.

5. For use in a vehicle windscreen, a sheet of toughened glass of soda-lime-silica composition which sheet has a thickness in the range of 0.8 mm to 3.5 mm, a modulus of rupture in the range $14 \times 10^3$ p.s.i. to $42 \times 10^3$ p.s.i., and a fragmentation number upon destruction by sharp impact which is within the range of 8 fragments per $cm^2$ to 100 fragments per $cm^2$, the fragments being characterised by granular nature free of sharp edges.

6. Toughened glass comprising a sheet of glass of soda-lime-silica composition having a thickness within the range of 0.8 mm to 3.5 mm, a modulus of rupture within the range of $14 \times 10^3$ p.s.i. to $56 \times 10^3$ p.s.i., a fragmentation number upon destruction by sharp impact which is within the range of 8 fragments per $cm^2$ to 100 fragments per $cm^2$, and having a substantially continuous variation in stress therein, commencing with maximum compressive stress at the glass surfaces and extending to maximum tensile stress in the central region between the surfaces.

7. Toughened glass which comprises a glass sheet of soda-lime-silica composition having a thickness in the range 0.8 mm to 3.5 mm, a modulus of rupture within the range of $14 \times 10^3$ p.s.i. to $42 \times 10^3$ p.s.i., a fragmentation number upon destruction by sharp impact which is within the range of 8 fragments per cm² to 100 fragments per cm², and having a substantially continuous variation in stress therein, commencing with maximum compressive stress at the glass surfaces and extending to maximum tensile stress in the central region between the surfaces.

8. Liquid quenched toughened glass of soda-lime-silica of a thickness in the range 1.5 mm to 2.5 mm, having a modulus of rupture in the range $14 \times 10^3$ p.s.i. to $42 \times 10^3$ p.s.i., and a fragmentation number upon destruction by sharp impact which is within the range of 8 fragments per cm² to 75 fragments per cm².

9. Toughened glass which comprises a glass sheet of soda-lime-silica composition having a thickness in the range 1.5 to 2.5 mm, a modulus of rupture in the range $14 \times 10^3$ p.s.i. to $28 \times 10^3$ p.s.i., and a fragmentation number upon destruction by sharp impact which is within the range of 8 fragments per cm² to 65 fragments per cm², the fragments being characterised by granular nature free of sharp edges.

10. Liquid quenched toughened glass of soda-lime-silica composition having (1) a thickness of 1.8 mm, (2) a modulus of rupture in the range $14 \times 10^3$ p.s.i. to $56 \times 10^3$ p.s.i., and (3) a fragmentation number upon destruction by sharp impact which is within the range of 8 fragments per cm² to 75 fragments per cm², and having a substantially continuous variation in stress therein, commencing with maximum compressive stress at the glass surfaces and extending to maximum tensile stress in the central region between the surfaces.

11. Toughened glass which comprises a sheet of glass of soda-lime-silica composition having (1) a thickness of 1.8 mm (2) a modulus of rupture in the range $14 \times 10^3$ p.s.i. to $42 \times 10^3$ p.s.i., and (3) a fragmentation number upon destruction by sharp impact which is within the range of 8 fragments per cm² to 75 fragments per cm², the fragments being characterised by granular nature free of sharp edges.

12. Toughened glass which comprises a sheet of soda-lime-silica glass of thickness 1.8 mm, having a modulus of rupture in the range $14 \times 10^3$ p.s.i. to $28 \times 10^3$ p.s.i., and a fragmentation number upon destruction by sharp impact which is within the range 15 fragments per cm² to 45 fragments per cm², the fragments being characterised by granular nature free of sharp edges.

* * * * *